United States Patent [19]
Alexander et al.

[11] Patent Number: 5,986,654
[45] Date of Patent: *Nov. 16, 1999

[54] SYSTEM AND METHOD FOR RENDERING ON-SCREEN ICONIC BUTTONS WITH DYNAMIC TEXTUAL LINK

[75] Inventors: Chip Alexander, Belmont; Robert Hoexter, Fremont, both of Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/864,844

[22] Filed: May 29, 1997

[51] Int. Cl.$^6$ .................................................... G06F 15/00
[52] U.S. Cl. .......................... 345/349; 345/335; 345/348; 345/354
[58] Field of Search .................................. 345/326, 348, 345/349, 352, 353, 354, 357, 335; 701/500, 501, 502

[56] References Cited

U.S. PATENT DOCUMENTS

| | | | |
|---|---|---|---|
| 5,687,331 | 11/1997 | Volk et al. | 345/352 |
| 5,724,595 | 3/1998 | Gentner | 345/335 |
| 5,761,656 | 6/1998 | Ben-Shachar | 345/335 |
| 5,808,613 | 9/1998 | Marrin et al. | 345/355 |
| 5,835,712 | 11/1998 | DuFresne | 395/200.33 |
| 5,838,906 | 11/1998 | Doyle et al. | 345/326 |

*Primary Examiner*—Ba Huynh
*Attorney, Agent, or Firm*—Wagner Murabito & Hao LLP

[57] ABSTRACT

A display button for a web page integrating both a graphic pictorial image with character based textual information (with link) into a single iconic button. By providing a graphic image within a display button, the present invention provides the advantages of a graphic icon, e.g., speed of location and user recognition as well as increased meaning. By providing a character based dynamic textual link, the present invention provides an iconic button whose information can be readily translated between various languages (e.g., Italian, English, French, German, etc.) without requiring the image to be redrawn using complex and time consuming means; e.g., using an artist and a drawing tool. Instead, translation can be accomplished using automatic word and/or phrase conversion. Preferably, the display button of the present invention is represented in a table structure within HTML. The table structure contains two end cells which display graphic images therein and in between them a slightly shorter text cell is inserted that can display character based text. Filling the height difference between the text cell and the end cells are thin horizontal row cells that are colored to mach the end cells. The background colors of all the cells are selected to create a visual image of a complete display button having both graphic images and textual information. The display button can be selected by a user to obtain further display information or to advance to another web page or another website (e.g., used as a link). Within the present invention, a subroutine structure can be created in a language called JavaScript that is useful in reducing the amount of program code required to generate multiple display buttons in a single web page.

20 Claims, 11 Drawing Sheets

SYSTEM AND METHOD FOR RENDERING ON-SCREEN ICONIC BUTTONS WITH DYNAMIC TEXTUAL LINK

This application is a Continued Prosecution of U.S. Patent Application entitled, "A SYSTEM AND METHOD FOR RENDERING ICONIC BUTTONS WITH DYNAMIC TEXTUAL LINK" Ser. No.: 08/864,844 Filed May 29, 1997.

BACKGROUND OF THE INVENTION

(1) Field of the Invention

The present invention relates to the field of graphic user interfaces (GUIs) within computer systems. More specifically, the present invention relates to a GUI that is particularly useful in applications relating to the internet.

(2) Prior Art

Browsers display on-screen buttons, links and icons that users select in order to navigate through the information presented at a world wide web (http://www) site or to transfer to other websites. One language called hypertext markup language or HTML is often used to specially code the display screens or "web pages" that are presented on a display screen to a computer user that is connected to a particular website. Buttons and links that are used to initiate user actions in HTML are typically presented using one of two different methods. One prior art method uses only text to represent a button and the other prior art method uses only a graphic image to represent the button.

In the first prior art method, buttons and links to other websites can display specified text (e.g., ASCII characters), but do not include an iconic picture associated with the button or link. Although text display alone is useful in many applications, users and web page designers desire to use icons (graphic pictures) associated with buttons and links because the artistic features of a graphic picture are very beneficial. For instance, a button with a icon (e.g., an iconic button) is faster to locate and recognize than a text only button because it offers more distinctive information, especially over repeated use. Secondly, the iconic button clarifies and confirms the meaning of the button and its user action beyond what is achievable with a single word or phrase of text in a text only button. Lastly, the iconic button adds visual appeal to the web page thereby making use of the website more enjoyable by the user. This can translate into increased sales, increased dissemination of information, increased advertisement coverage, etc., which are all desired by most web page designers and sponsors.

In the second prior art method, graphic pictures are provided in web pages; however, only the graphic picture is included without any character based text unless the English label is drawn into the iconic image (e.g., in bit-mapped or raster format). Pictures are rarely so clear that they do not need a text label to supplement their meaning at least for the first time a user sees them. To solve this problem, many web page designers place English text in graphic form into the graphic picture. However, placing English text into the picture in graphic form creates many problems.

The first problem is that graphic form text (e.g., bit mapped text) is not easily translatable between different languages (e.g., Italian, English, French, German, etc.). In order to translate graphic form text between languages, the translator for each language needs to use a drawing tool to redraw all of the graphic form text inside the image that is to be translated. In this case, the task of translating web information is accomplished by hand where the images are redrawn by a skilled artist and this technique requires a large amount of complex, custom and time consuming effort. What is desired instead is a display button for a web page that displays both an icon and character based text so that the text can be readily translated using a semi-automated process of word and phrase substitution so that graphics artists and time consuming drafting tools are not required in the translation phase.

A second problem of having graphic-form text within a display button is that the graphic-form text is static. This prevents the insertion of dynamic status information (e.g., information capable of being changed or obtained at run-time) into the display button. Dynamic status and content specific information can improve the usability of a web page. For instance, if a button is used to send email (electronic mail) to a manager currently assigned to approve a requisition for hire, it is not currently possible to readily create, dynamically, a graphic image of the manager's name within the display button. Instead, web page designers create a generic and static email button that would have a graphic-form of the text "Email Approving Manager" without any indication as to the manager's name within the display button.

Also, with a static image, it is not possible to illustrate to a user, in a display button, the results of a particular computer operation. For example, assume a button is used to display all the matching records of a computer operation (e.g., a keyword search) rather than just a small subset. It would be advantageous to provide, in the display button, the actual number of records that are to be downloaded so that a user does not inadvertently download an inordinate number of records which could overflow the computer memory. In this case it would be advantageous to provide a display button that indicated the number of records, e.g., "Download 254 Records." However, using the second method discussed above, since the graphic-form text information is static, run-time computer results cannot be integrated into the display button.

Accordingly, what is needed is a display button for a web page that contains graphic images and text whereby the text can be readily translated between different languages without the need for the image to be redrawn using an artist and a drawing tool package. What is needed further is a display button for a web page that contains graphic images and text whereby the information displayed incorporates dynamic information, such as status, names, and results of operations. The present invention display button provides the above features and others not necessarily recited above but clear within further discussions of the present invention herein.

SUMMARY OF THE INVENTION

A display button is disclosed for a web page integrating both a graphic pictorial image with character based textual information into a single iconic button. By providing a graphic image within a display button, the present invention provides the advantages of a graphic icon, e.g., speed of location and user recognition as well as increased meaning. Further, the present invention provides a mechanism whereby dynamic textual information (e.g., a link) can be filled-in at the time the button is displayed and therefore the button text is not static but is rather dynamic. This is the case because the present invention builds the display button at the time of on-screen rendering thereby allowing the dynamic modification of the text link before the button is displayed. By providing character based dynamic textual information, the present invention provides an iconic button whose information can be readily translated between various languages (e.g., Italian, English, French, German, etc.) without requiring the image to be redrawn using complex and time consuming means, e.g., using an artist and a drawing tool. Instead, translation can be accomplished using automatic word and/or phrase conversion.

The display button of the present invention is preferably represented in a table structure within HTML. The table structure contains two end cells which display graphic images therein and in between them a slightly shorter text cell is inserted that can display a character based text link. Filling the height difference between the text cell and the end cells are thin horizontal row cells that are colored to provide an edge boundary with shadowing to thereby create a standard three dimensional (3D) look of a button. The background colors of all the cells are selected to create a visual image of a complete display button having both graphic images and textual information. All the graphical images, as well as the textual information, are defined as links, responsive to a mouse click. A user can select areas of the display button to obtain further display information or to advance to another web page or another website (e.g., used as a link). The language, JavaScript, can be used to proceduralize creation of the buttons, reducing the amount of code required for rendering multiple buttons on a web page.

More specifically, in a computer system having a processor coupled to bus, a memory coupled to the bus and a display screen, embodiments of the present invention include instructions stored in the memory for generating a display button on the display screen when executed by the processor, the instructions comprising: first cell instructions creating a first end cap display region and identifying a first graphic image for display in the first end cap display region; second cell instructions creating a second end cap display region and identifying a second graphic image for display in the second end cap display region; third cell instructions creating a text display region to be rendered between the first and second end cap display regions and having a character based textual link for display therein with a text background color matching one of said first and second graphic images; fourth cell instructions creating a first upper row display region of a first background color to be rendered between the first and second end cap display regions and above the text display region; and fifth cell instructions creating a first lower row display region of a second background color to be rendered between the first and second end cap display regions and below the text display region, wherein the display regions integrate the graphic images and the textual information into one unified visual display button on the display screen.

DETAILED DESCRIPTION OF THE INVENTION

In the following detailed description of the web page display button of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 1), or similar electronic computing device, that manipulates and transforms data represented as physical (electronic)

quantities within the computer system's registers and memories into other data similarly represented as physical quantities within the computer system memories or registers or other such information storage, transmission or display devices.

COMPUTER SYSTEM ENVIRONMENT

Figure 1:
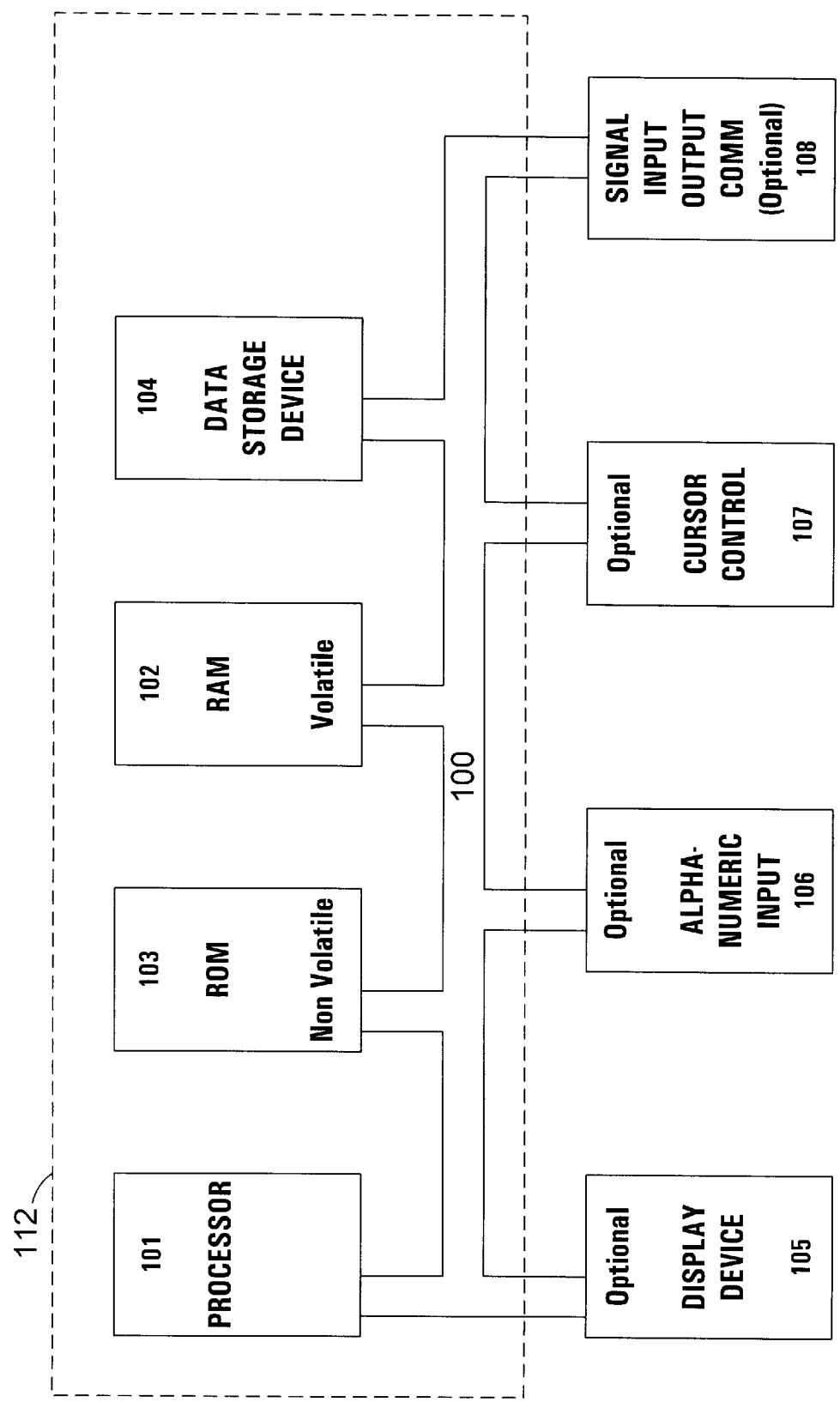
FIG. 1 illustrates a block diagram of a general purpose computer system that can be used to render display buttons in accordance with the present invention.

Refer to FIG. 1 which illustrates a computer system 112. Within the following discussions of the present invention, certain processes and steps are discussed (e.g., processes 400, 450, 500) that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101.

COMMUNICATION SYSTEM ENVIRONMENT

Figure 2:
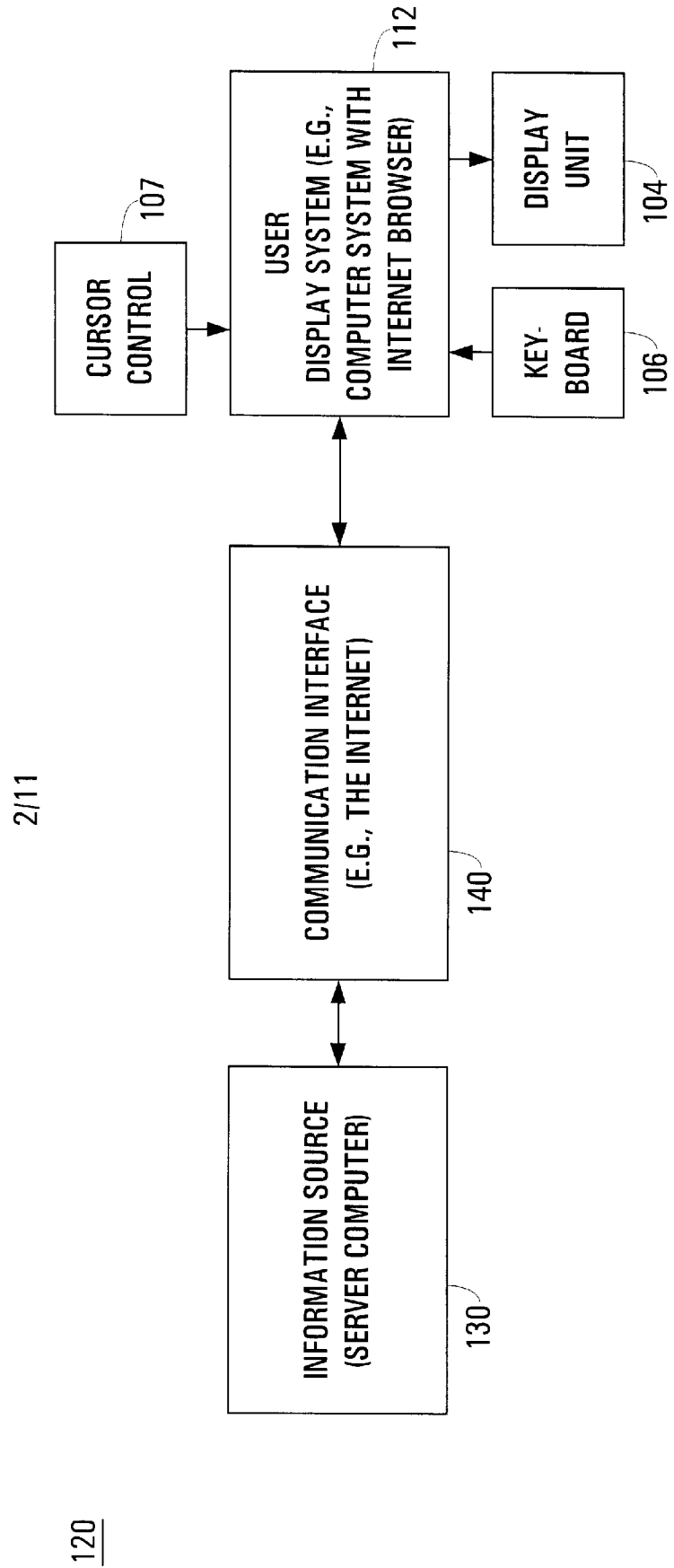
FIG. 2 illustrates a block diagram of a server or information source communicating with a user over a communication interface (e.g., the internet).

In one embodiment, the present invention can operate in conjunction with a number of different communication systems as shown in FIG. 2. FIG. 2 illustrates a hardware system 120 in which the present invention can be employed with an exemplary multi-user communication interface (e.g., the "internet" in one implementation) 140. Although the internet 140 is used as one example, it is appreciated that the present invention can be employed in conjunction with many other communication systems. The internet 140 is a well known world wide connection computer systems that operate using the well known internet protocol. The internet 140 is one type of multi-user computer system. Other internet applications (e.g., using specific protocols) operate on top of the internet protocol. One such application is the well known world wide web or www internet application which operates using the hypertext transfer protocol (HTTP). HTTP uses coded information in the hypertext markup language (HTML) to construct visual web pages which interact with internet users. The www internet application is a "demand system" in which a user requests information from a site and the site transfers the information back to the user on-line. Also well known is the email internet application which operates using the simple mail transport protocol (SMTP). The email internet application is a "present system" in that an information transfer command originates from a sender site and information pursuant to that command is presented to the target email address. Another internet application is the file transfer internet application which operates using the file transfer protocol (FTP).

Figure 9:
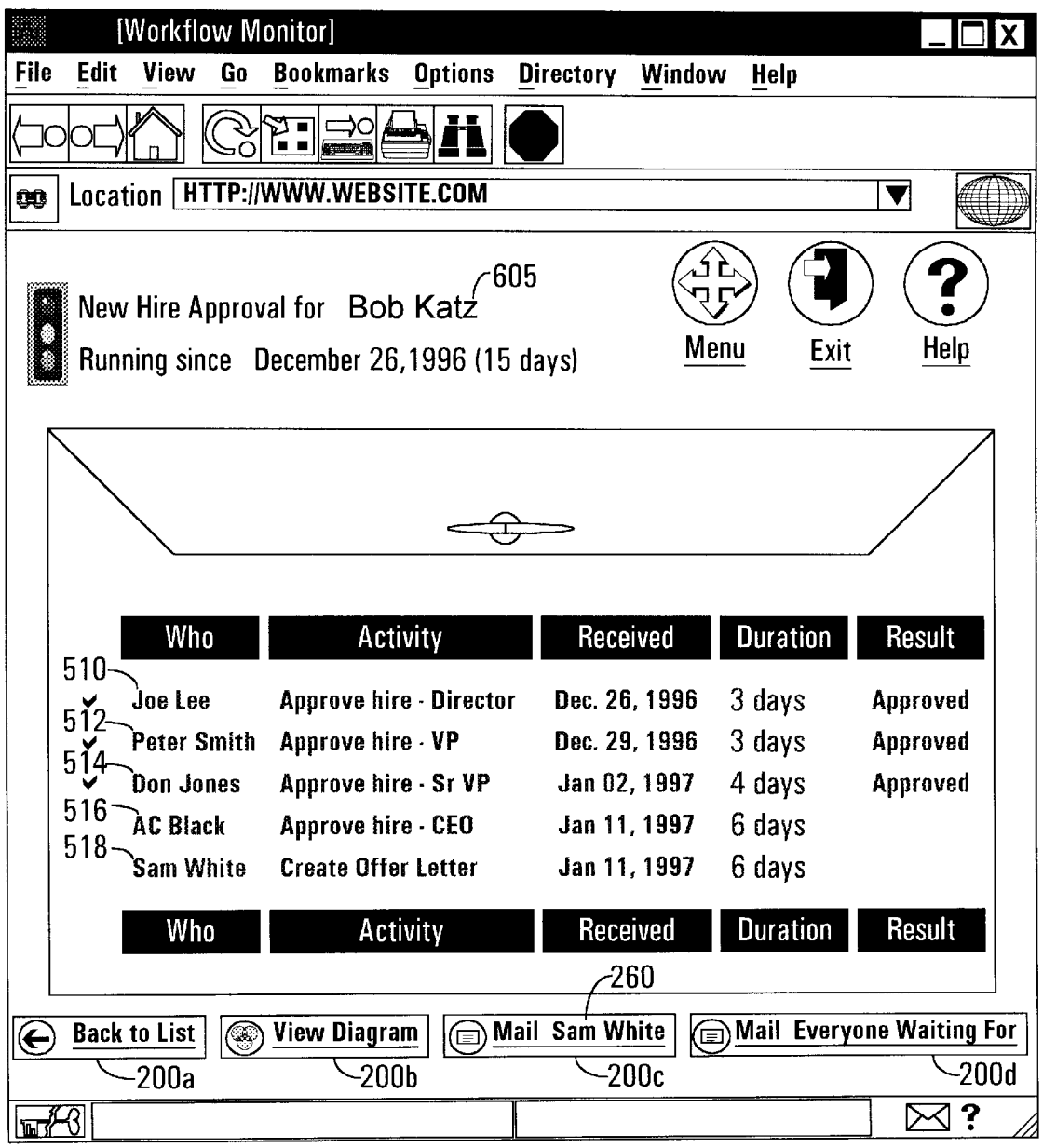
FIG. 9 illustrates an exemplary web page implemented with display buttons of the present invention specifically showing the integration of real-time content specific information into a display button.
Figure 10:
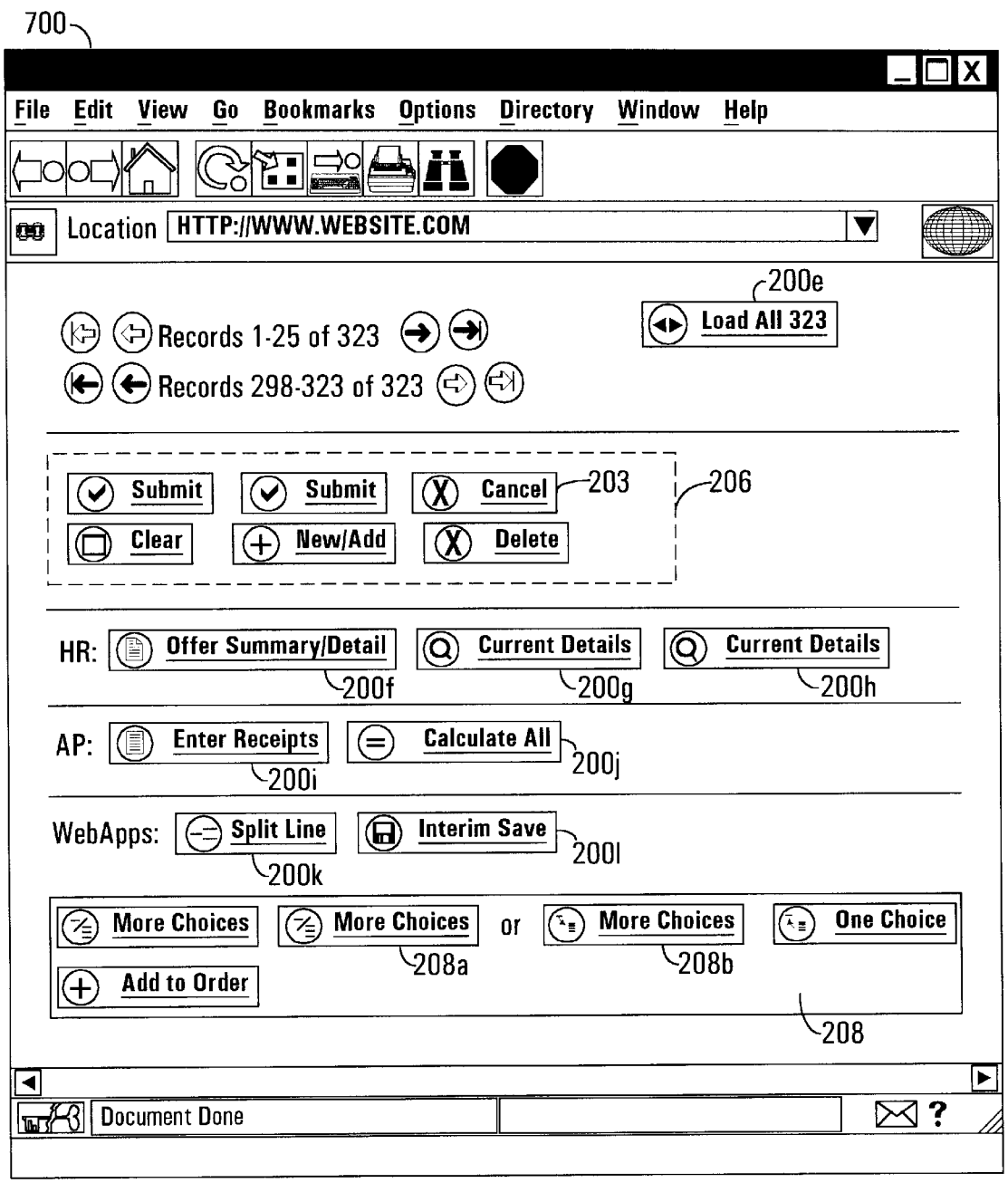
FIG. 10 illustrates an exemplary web page implemented with display buttons of the present invention specifically showing the integration of real-time result information into a display button.

In general, the internet 140 can be used to provide a communication interface (e.g., a logical connection) between a server computer 130 (of the design shown in FIG. 1) containing a source of information and a user having a computer system 112. The user (and system 112) can obtain information from the information source system 130 by selecting certain choices presented in the form of visible objects within web pages. The web pages are forwarded in coded (in HTML) from the information source system 130 to the user computer 112 and then constructed into visual pages using browser software that is installed on the user computer system 112. The visual pages are presented on display 104. Two exemplary web pages 600 and 700 are shown in FIG. 9 and FIG. 10. In one technique, the user interacts (e.g., using keyboard 106 or cursor control 107) with the web pages by selecting displayed buttons on the display screen 104. User selection of the display buttons can cause information in a web page to appear, can cause different web pages to appear or can cause the internet interface 140 to connect (e.g., "navigate") to another information source having new web pages, etc.

DISPLAY BUTTONS OF THE PRESENT INVENTION

Figure 3:
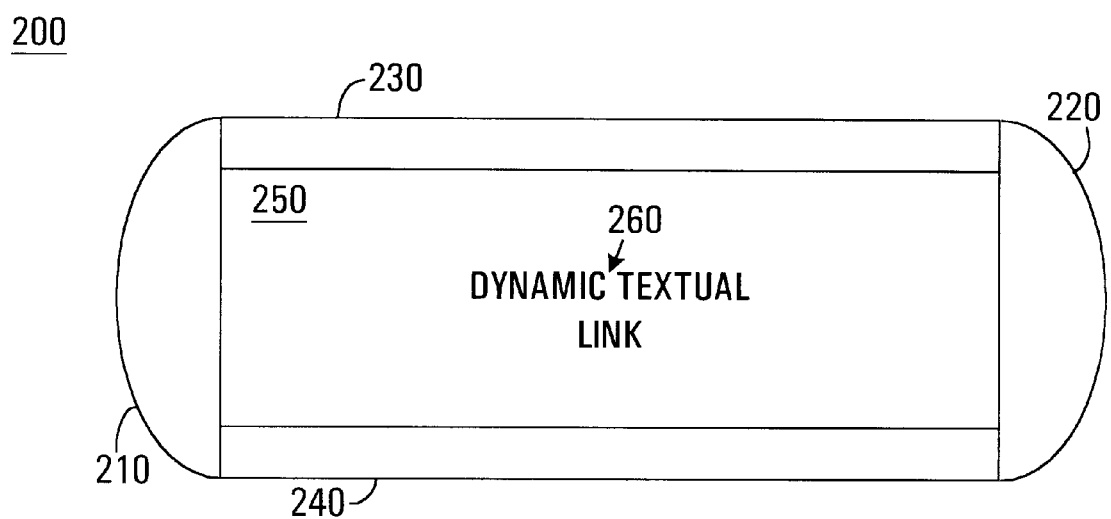
FIG. 3 is an illustration of a generic display button in accordance with the present invention.

FIG. 3 illustrates a display button ("button") 200 implemented in accordance with the present invention as displayed on a display screen 104.

The display button 200 is a visually displayed object that is an integration of character based textual information, e.g., information represented in character form, and some graphic images. The integration is organized in such a way that the overall display button object 200 appears to a viewer as a unified graphic image of a button having text and graphics displayed therein. The entire display button 200 appears to be a unified graphic object within a web page that the user can select for a particular computer function. The combination of text and graphics offered by the display button 200 of the present invention is designed to give the user maximum information for recognition and location of the button 200 and also to inform the user clearly as to the computer function that is performed when the button 200 is selected.

The display button 200 of the present invention is organized as follows. On the left side is a left end cap region having an end cap graphic image 210 displayed therein. In this example, the end cap graphic image 210 is the left rounded edge of a generally oblong display button 200. On the right side is a right end cap region having an end cap graphic image 220 displayed therein. In this example, the end cap graphic image 220 is the right rounded edge of a generally oblong display button 200. Between the left 210 and right 220 end cap graphic images is located a text display region 250.

The present invention displays a character based textual link 260 in the text display region 250. The textual link 260 is a combination of characters, words, phrases, punctuation, etc., (collectively textual information) and a link. The texutal link 260 causes the computer system 112 (and/or the server computer system 130) to perform a particular function defined within or by the link when a user selects the display button. Generally, the textual link 260 is an HTML hypertext link that causes the computer system 112 (via the sever computer system 130) to connect to a particular website defined by the link upon a user selecting the text display region 250. Alternatively, the textual link 260 can cause a particular web page (e.g., other information) to be displayed within a same website. It is appreciated that within the present invention, the textual link is dynamic in that it can be changed at any time just before rendering of the display button on display screen 104.

One of the left and right end cap graphic images 210 and 220 contains a graphic picture that supports the meaning of the textual link 260. This is shown by example to follow. However, both end cap graphic images can contain such a graphic picture. Preferably, the background text color selected for region 250 is matched to the color of one or more of the graphic images 210 and 220 to give button 200 the appearance of a unified visual object to the user.

Between the left and right end cap graphic images 210 and 220 and above the text display region 250 of FIG. 3 is one or more upper row display regions 230. Between the left and right end cap images 210 and 220 and below the text display region 250 is one or more lower row display regions 240. The upper and lower row display regions 230 and 240 act as a visual molding bridging the left and right end cap images 210 and 220 around the textual display region. These display regions 230 and 240 act as a button boundary and can give button 200 depth. As discussed above, the background color of the text display region 250 is the same as the color of the left and right end cap images 210 and 220 making their separation invisible. By optionally selecting matching background colors for the text display region and one or more of the upper or lower row display regions 230 and 240, the present invention can further create a single unified graphic image of a button 200 that incorporates a character based textual link therein. However, by selecting lighter and darker colors for regions 230 and 240, the present invention offers a boundary edge image and depth shadowing to give button 200 visual depth perception.

This integrated visual result is advantageous because although the graphic display button 200 of the present invention appears to look fully graphic (e.g., bit mapped) in nature, it nevertheless contains a character based textual information center 260 (in region 250) that is easily modified to contain various text messages. In other words, the character based textual link 260 is generally left out of the graphic images 210 and 220. The arrangement of the present invention allows an icon (image 210 and/or image 220) to be combined with a label (text) which is translatable and can be dynamically inserted to become more specific to the action it performs for the user. However, the overall button 200 still appears like one unified visual object to the user, as opposed to placing the image and text near each other and using only their proximity to suggest the text labels the picture. Therefore, the present invention offers all of the advantages of providing graphic images in a web page button (e.g., ease of location, ease of user recognition and the conveyance of more content based information), it also offers dynamically modifiable character based textual information, e.g., of the link 260. In one embodiment, the textual link 260 is in the form of an HTML hypertext link.

One exemplary type of character based coding that can be used within the present invention for text 260 is the ASCII format (American Standard Code for Information Interchange) for character codes wherein each letter of the alphabet (including numbers and punctuation characters) is represented by a number. This type of representation is often called "textual, "text" or "character based" format. Representing information in text format is useful because words can be transmitted between computers using numbers (signals) that are standardized. Computer systems 112 can automatically obtain, manipulate, transmit and store information represented in text formats.

The graphic images (e.g., 210 and 220) that are represented within the display button 200 of the present invention are generally contained in the end cap regions. Graphic images within the present invention are represented not as character codes (as textual link 260), but as bit mapped data or "raster" data. In these formats, an image is represented as a two dimensional matrix of pixels (with color attributes, etc.) that form the image when displayed on a raster type screen 104.

Figure 4:
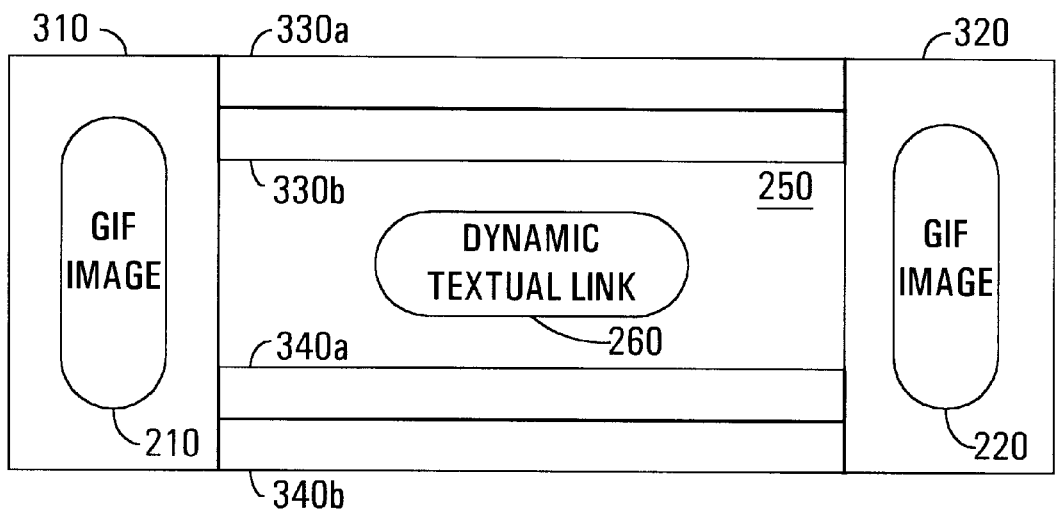
FIG. 4 is a logical diagram of the cells used in rendering a display button in accordance with the present invention.

FIG. 4 is a logical diagram of the display regions within the display button 200 of the present invention. In one embodiment, these display regions are constructed as data constructs within a table in HTML. Shown is the left end cap display region 310 containing a graphic image 210 displayed therein. Shown also is the left end cap display region 320 containing the graphic image 220 displayed therein. The present invention allows the provision of multiple upper row display regions and shown in FIG. 4 are two exemplary upper row display regions 330*a* and 330*b* although 3 or more could also be used. The present invention also allows the provision of multiple lower row display regions and shown in FIG. 4 are two exemplary lower row display regions 340*a* and 340*b* although 3 or more could also be used. Each of the row display regions 330*a*, 330*b*, 340*a*, and 340*b* can be displayed with a selected background color.

The textual display region 250 located in the spatial center of the other display regions contains the character based textual link 260 as well as a selected background color. The background colors of the display regions of display button 200 and the graphic images 210 and 220 can be selected such that the an outer boundary or edge image is generated which gives a visually appealing rendition of a slightly three dimensional push button (see button 203, FIG. 10, etc.). Specifically, in one embodiment the upper row regions 330*a* and 330*b* create a light shadow boundary (region 330*a* white and region 330*b* gray) while lower row regions 340*a* and 340*b* create a dark shadow boundary (region 340*a* gray or dark gray and region 340*b* dark gray or black) or vice-versa.

It is appreciated that according to well known browser techniques for displaying cells within a table structure in HTML, the upper and lower display regions 330*a*–330*b* and 340*a*–340*b* and the text display region 250 automatically expand or contract to accommodate the size of the textual link 260 placed within region 250. The upper and lower display regions 330*a*–330*b* and 340*a*–340*b* fill with color according to their length as determined by the textual link 260 regardless of how large or small the text 260 stretches the text display region 250 to be. Within button 200 of FIG. 4, the background color of the text displays region 250 is designed the same or similar as the color of the left and right end cap images 210 and 220 making their separation invisible.

In one embodiment of the present invention, the display button 200 of the present invention is realized using HTML code as a table structure of display cells. The display cells are then rendered, via browser software of system 112, within a web page that is displayed onto a display screen 104. An example pseudo code representation of a display button 200 in accordance with the present invention is shown in Table I below. The code of Table I is stored in computer readable memory units of system 112 and when executed (e.g., by a browser) creates a display button on screen 104. Associated with each display cell definition in Table I is its corresponding element number of FIG. 4.

TABLE I

| 310: | row, | cell, spans 5 rows, link to GIF containing image 210 |
|---|---|---|
| 330a: | | cell, background color gray, GIF of one pixel |
| 320: | | cell, spans 5 rows, link to GIF containing image 220 |
| 330b: | row, | cell, background color white, GIF of one pixel |
| 250: | row, | cell, background color gray, link to text 260 that does Y |
| 340a: | row, | cell, background color dark gray, GIF of one pixel |
| 340b: | row, | cell, background color black, GIF of one pixel. |

In Table I, GIF stands for a graphic image file and its name and Y stands for a computer function that is to be performed upon user selection of the text display region 250 of the display button 200. In the table data structure of Table I, the text display region 250 is active or "hot" in that a cursor selection in this screen area causes the computer function X to be implemented. For example, if the display button of Table I was a "cancel" button that indicated a certain computer record should be eliminated, the function X would then perform this computer function when selected by a user. Also, it is appreciated that the color of the GIF images 210 and 220 is programmed to match the background color of the text display region 250.

It is appreciated that with respect to the internet 140 (FIG. 2) implementation, the function X can be invoked by the user interacting with the browser on system 112; however, in the general case, the function X is performed by the server system 130. In other situations, system 112 can also perform the function.

The display button represented by the cell data of Table I can be modified where the end cap regions 310 and 320 are also active regions. This is shown in Table II below:

TABLE II

| 310: | row, | cell, spans 5 rows, link to GIF containing image 210 that does Y |
|---|---|---|
| 330a: | | cell, background color gray, GIF of one pixel |
| 320: | | cell, spans 5 rows, link to GIF containing image 220 that does Y |
| 330b: | row, | cell, background color white, GIF of one pixel |
| 250: | row, | cell, background color gray, link to text 260 that does Y |
| 340a: | row, | cell, background color dark gray, GIF of one pixel |
| 340b: | row, | cell, background color black, GIF of one pixel. |

In the example of Table II, the user can select region 250, region 310 or region 320 to invoke the function Y. It is appreciated that in the general case each of the three regions above perform the same computer function (e.g., function Y) when selected. However, each of the three regions above could alternatively offer a separate computer function if needed (e.g., X, Y and Z). Table III and Table IV together below illustrate exemplary implementations of table structures in accordance with the present invention to realize a display button 200 in HTML.

TABLE III

```
<html>
. . .
<table border=0 cellpadding=0 cellspacing=0
align=left><tr><td height=28
```

TABLE III-continued

```
width=29 rowspan=5>
    <!-href is button action, and gif is button graphic->
    <a href="calexand.html" on Mouseover="window.status=
    'Completes changes';
return true">
    <img src="/atg/standards/std/webicons/
    dynamic_buttons/FNDBSBMT.gif"
height=28 width=29
border=no></a></td>
<td height=1 bgcolor=#E1E1E1><img
src="/atg/standards/std/webicons/
dynamic_buttons FNDDBPXE.gif"
width=1 height=1></td>
<td height=28 width=12 rowspan=5>
    <!-href is button action->
    <a href="calexand.html" onMouseover="window.status=
    'Completes changes';
return true">
<img src="/atg/standards/std/webicons/
dynamic_buttons/FNDDBEND.gif" height=28
width=7
border=no></a></td></tr>
<tr><td height=1 bgcolor=#FFFFFF><img
src="/atg/standards/std/webicons/
dynamic_buttons/FNDDBPXW.gif"
width=1 height=24 align=center valign=center
bgcolor=#cccccc nowrap>
    <!-href id button action, and cell text appears
    on the button->
    <a href="calexand.html"onMouseOver=
    "windows.status='Completes changes';
retrun true">
    <font size=3 color=#000000>OK</
    font></a></td></tr>
<tr><td height=1 bgcolor=#999999><img
src="/atg/standards/std/webicons/
dynamic_buttons/FNDDBPX9.gif"
width=1 height=1></td></tr>
<tr><td height=1 bgcolor=#000000><img
src="/atg/standard/std/webicons/
dynamic-buttons/FNDDBPXB.gif"
width=1 height=1></td></tr>
</table>
```

TABLE IV

```
<tabel border=0 cellpadding=0 cellspacing=0)
align=left><tr><td height=28
width=29 rowspan=5>
    <!href is button action, and gif is button graphic->
    <a href="calexand.html"onMouseOver-
    "window.status='Cancels changes';retrun
true">
    <img src="/atg/standards/std/webicons/
    dynamic_buttons/FNDBCNCL.gif"
height=28 width=29
border=no></a></td>
<td height=1 bgcolor=#E1E1E1><img
src="/atg/standards/std/webicons/
dynamic_buttons/FNDDBPXE.gif"
width=1 height=1></td>
<td height=28 width=12 rowspan=5>
    <!-href is button action->
    <a href="calexand.html" onMouseOver=
    "window.status='Candels
changes'; return true">
<img src="/atg/standards/std/webicons/
dynamic_buttonsFNDDBEND.gif" height=28
width=7
border=no></a></td><tr>
<tr><td height=1 bgcolor=#FFFFFF><img
src="/atg/standard/std/webicons/
dynamic_buttons/FNDDBPXW.gif"
width=1 height=1></td></tr
<tr><td height=24 align=center valign=center
bgcolor=#cccccc nowrap>
```

TABLE IV-continued

```
<!href is button action, and cell text
appears on the button->
    <a href="calesand.html"onMouseover=
    "window.status='Cancels changes';return
true">
        <font size=3 color=#000000>Cancel</
        font></a></td></tr>
<tr><td height=1 bgcolor=#999999><img
src="/atg/standards/std/webicons/
dynamic_buttons/FNDDBPX9.gif
width=1 height=></td></tr>
<tr><td height=1 bgcolor=#000000><img
src="/atg/standards/std/webicons/
dynamic_buttons/FNDDBPXB.gif"
width=1 height=1></td></tr>
</table>
</td></tr></table>
...
</html>
```

Figure 5A:
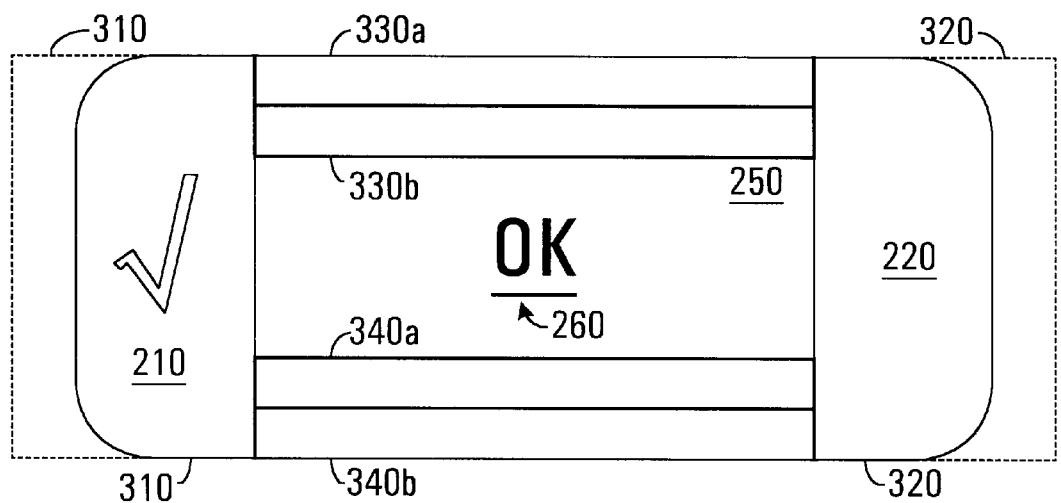
FIG. 5A is an illustration of an exemplary display button in accordance with the present invention showing the integration of graphic images and textual information for an "accept" action.

FIG. 5A illustrates an exemplary display button 201 in accordance with the present invention. As discussed above, the graphic images 210 contained in the end cap regions (e.g., 310 and 320) of the present invention are generally used to add visual meaning to support the computer function defined in the textual link 260 displayed in the text region 250. In this exemplary button, the textual link 260 indicates an acceptance of some type with the text "OK" and the graphic image 210 of a check mark with shadow supports the acceptance action because it suggests a meaning that is positive wherein the record or item of interest should be accepted or passed. The graphic image 210 also has rounded edges on the left side to represent the curved side of a push button. The graphic image 220 on the right is a solid image but also has rounded edges on the right side to represent the other curved side of the push button.

In the example of FIG. 5A, the two upper rows 330a and 330b and the two lower rows 340a and 340b are colored so that they create a button boundary adding depth to the display button 201. For example, the two upper row displays 330a and 330b contain the background colors gray and white, respectively. The top gray line 330a is provided so that the white line 330b is visible even if the display button 201 is on a white screen background. The two lower row display regions 340a and 340b contain gray and black background colors, respectively, to give the visual impression of a boundary with a bottom shadow adding depth to the display button. The background color the text region 250 is gray in this example. A visual representation of this type of shadowing is shown in the web page 700 of FIG. 10.

Figure 5B:
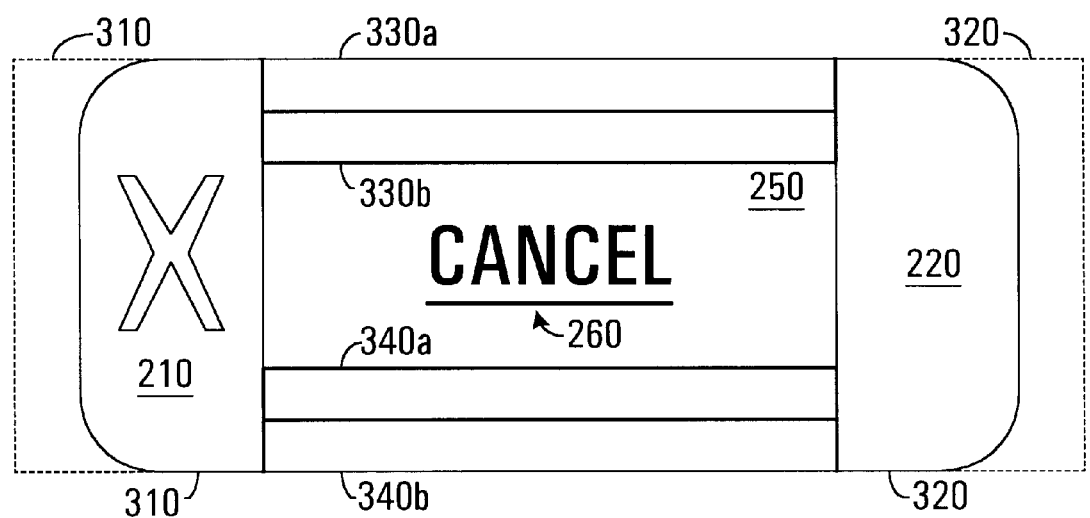
FIG. 5B is an illustration of an exemplary display button in accordance with the present invention showing the integration of graphic images and textual information for a "cancel" action.

FIG. 5B illustrates another exemplary display button 203 in accordance with the present invention. Button 203 is analogous to button 201 however the character based textual link 260 is "cancel" instead of accept and the graphic image 210 represents an "X" with shadow offering a meaning that is negative or unacceptable. Button 203 also contains the shadowing and other graphic image representations that give the visual impression of a three dimensional push button. A visual representation of the button 203 is shown in the web page 700 of FIG. 10.

Figure 6:
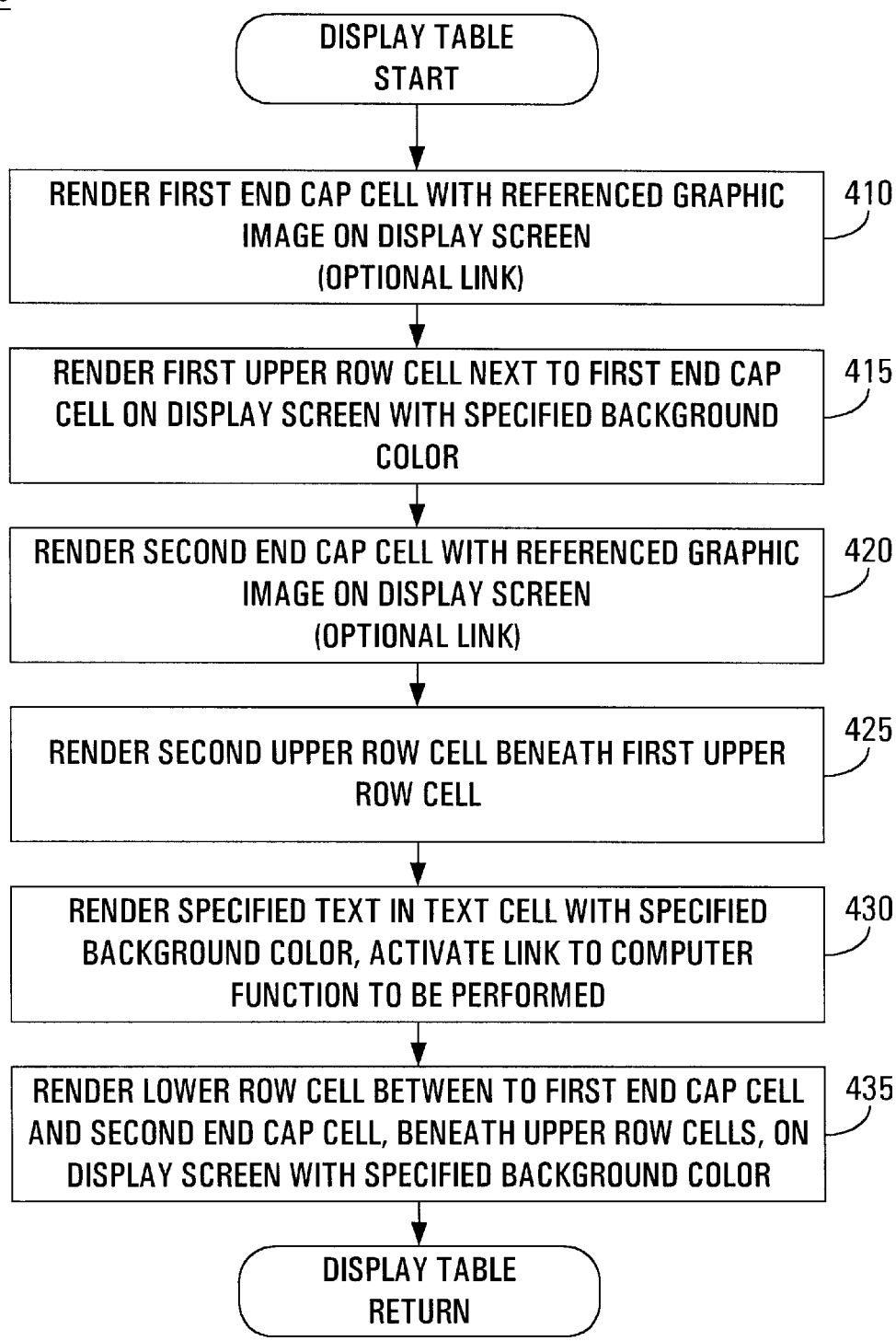
FIG. 6 is a flow diagram of steps performed by the present invention for rendering a display button of a web page on a computer display screen.

FIG. 6 illustrates a flow chart of steps 400 performed by computer system 112 (e.g., the web browser system) to render a display button 200 of the present invention on screen 104. As discussed above, the present invention provides a mechanism whereby dynamic textual information of the textual link 260 can be filled-in at the time the display button is rendered and therefore the display button text is not static but is rather dynamic. This is the case because the process 400 of the present invention builds the display button at the time of on-screen rendering thereby allowing the dynamic modification of the text link 260 before the display button is displayed.

Using the pseudo code shown in Table I and Table II, flow chart 400 of FIG. 6 illustrates the order of rendering on display screen 104. Process 400 is implemented as instructions stores in computer readable memory units of system 112 and assumes (1) a table structure has already been identified for display and (2) the start screen coordinate (x, y) for the table structure has already been determined. It is appreciated that the screen coordinate placements of display regions of button 200 are defined by the order of display region definition within a table structure (e.g., as shown in Tables I–IV) due to the manner in which HTML processes these defined display regions in their specified order.

At step 410, the computer system is informed by an instruction to span multiple rows (e.g., 5 rows). The first end cap table structure data is read from memory and the graphic image 210 it is linked to is obtained. Using the example of Table II, the first line of pseudo code is read and GIF image 210 is obtained. The first end cap image 210 is rendered on screen 104 having a height of 5 rows. At step 415, the second line of pseudo code of Table II is read and the first upper row display region 330a is displayed on screen 104 with the specified background color (e.g., gray) and having a height of one pixel. The length of the row 330a is determined based on the length of textual link 260. At step 420, the second end cap table structure data is read from memory and the graphic image 220 it is linked to is obtained. Using the example of Table II, the third line of pseudo code is read and GIF image 220 is obtained. The second end cap image 220 is rendered on screen 104 having a height of 5 rows. The position of image 220 on screen 104 is determined based on the length of row 330a. At step 425, the fourth line of pseudo code of Table II is read and the second upper row display region 330b is displayed on screen 104 with the specified background color (e.g., white) and having a height of one pixel. Row 330b is displayed just underneath first row 330a.

At step 430 of FIG. 6, the text display region 250 data is read from the fifth row of Table II and textual link 260 is displayed between end cap image 210 and 220. The background color is displayed and is designed to match the color of images 210 and 220. At step 435, the sixth and seventh lines of pseudo code of Table II are read and the first lower row display region 340a and the second lower row display region 340b are displayed on screen 104 with the specified background colors (e.g., dark gray and black, respectively) and having a height of one pixel each. The lengths of the rows 340a–340b are the same and are determined based on the length of textual link 260. The result of process 400 is a visual unified image of a button (having perspective) and graphic images and text integrated together into a single display button. In one implementation, a single pixel dot (of the appropriate selected background color) needs to be generated in each of the upper rows 330a, 330b and each of the lower rows 340a, 340b in order for the selected background color to appear across each of the rows.

It is appreciated that the data structure or table used to generate a single display button within the present invention can be formulated into a subroutine and called a variety of times by other routines to draw display buttons. In this case, arguments are passed to the button display process 400 to differentiate between display buttons. For instance, in one example, a subroutine called DynamicButton is defined and certain arguments are passed to it, such as the textual link 260 to be displayed, the image filenames for images 210 and 220 and the specific computer function to be performed. The computer system 112 then automatically generates a display button 200 in accordance with the present invention. It is appreciated that within the present invention a subroutine structure, described further below, can be created in a language called JavaScript that is useful in reducing the amount of program code required to generate multiple display buttons in a single web page.

Figure 7:
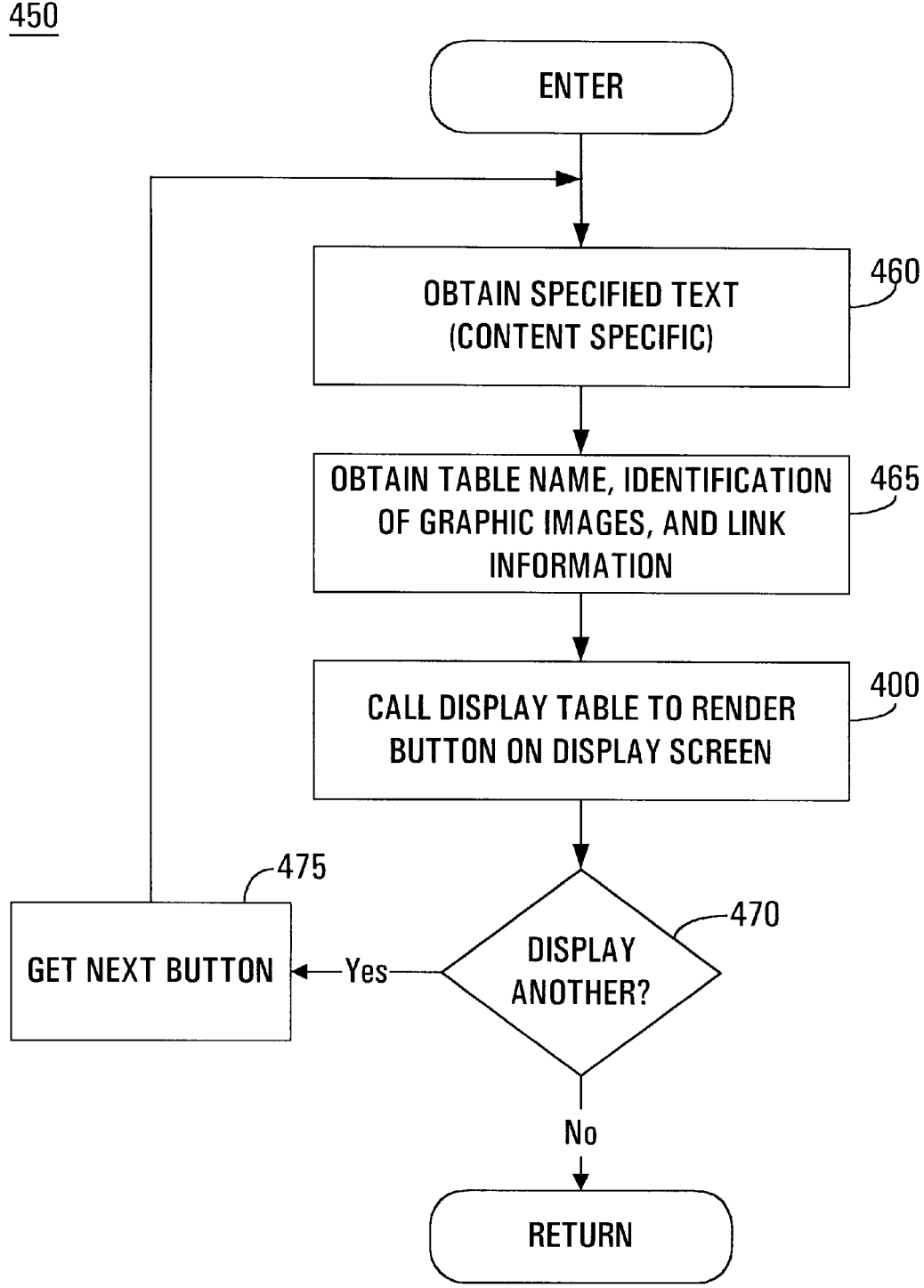
FIG. 7 is a flow diagram of steps performed by the present invention for rendering multiple display buttons of a web page on a computer display screen in accordance with the present invention.

FIG. 7 illustrates a flow diagram of a generic process 450 that uses a subroutine for displaying buttons 200 in accordance with the present invention so that multiple display buttons can be readily displayed within a web page. Process 450 is implemented as computer readable instruction code. Following process 450 is a particular example using JavaScript where the subroutine is placed directly into a web page definition and used thereafter to render multiple display buttons 200 of the present invention.

Process 450 commences with step 460 wherein specific text 260 is obtained. It is appreciated that text 260 can be obtained from a run-time computer computation or result. For instance, if a computer search is performed by a user and a particular number of records have been found, e.g., "323" records, then this number can be placed as text into textual link 260 at step 460. Alternatively, the name of a web site could also be obtained during run-time, based on the users previous selections, and used as text link 260. Or, the name of a person could be obtained and used as text link 260. In any of the above cases, the text 260 can be content specific within the present invention, e.g., it can be dependent on the user's previous selections or it can be dynamic in that it is based on the present set of some data within the server system 130 or user system 112 (FIG. 2) and changes dynamically over time.

At step 465 of FIG. 7 an optional table name can be obtained. If omitted, a default table structure is used by the present invention. Also in step 465 the names of graphic images 210 and 220 are obtained as well as a link to the particular computer action that is to be performed upon button selection. These arguments are then passed to process 400 which generates the display button 200 in accordance with the present invention using the display regions as defined in FIG. 4 and as modified by the information gathered in steps 460 and 465.

At step 470, the present invention determines if more display buttons are contained within a particular web page that is being displayed. If so, at step 475 the next button is selected and new information is then obtained for this next button. Pointers to the particular information obtained in step 460 and 465 are then updated so the proper information is found for the next display button. At step 470, if no more display buttons remain, process 450 returns.

Table V and Table VI below illustrate a particular implementation of process 450 and process 400 based on JavaScript. Table V illustrates exemplary programming instructions that create a subroutine (DynamicButton) for generating display buttons 200 in accordance with the present invention while Table VI defines sample calls to this code of Table V that actually generate exemplary buttons 200. This JavaScript code can be used to implement display buttons 200 within a web page definition and is particularly useful in reducing the code required for generating multiple display buttons on a single web page.

TABLE V

```
<head>
<script>
function DynamicButton(P_ButtonText,
                P_ImageFileName,
                P_OnMouseOverText,
                P_HyperTextCall,
                P_LanguageCode,
                P_JavaScriptFlag,
                P_DisabledFlag)
{
var1_ImagePath = 'http://www-
apps.us.oracle..com/atg/standards/std/webicons/
dynamic_buttons/';
var1_DisabledColor = #999999';
document.write('<table border=0 cellpadding=0
   cellspacing=0 align=left>');
if (P_ButtonText)
    document.write('<tr><td height=28 width=29
        rowspan=5>');
else
document.write ('<tr><td height=28 width=5>');
document.write ('<!--href is button action,
and gif is button graphic-->');
document.write('<a href="'+P_HyperTextCall+'" ');
document.write('onMouseOver="window.status="+
        P_OnMouseOverText+'" ; return true">');
document.write('<img src=" '+1_ImagePath
+P_ImageFileName+
        '"height=28 width=29 border=no></a></td>');
if (P_ButtonText)
    document.write('<td height=1 bgcolor=#CCCCCC><img
        height=1 width=1 src=" ' +
        1_ImagePath+ 'FNDDBPXC.gif"></td>');
if (P_ButtonText)
    document.write('<td height=28 width= 29 rowspan=5>');
else
    document.write('<td height = 28 width=5>');
document.write('< a href=' " +P_HyperTextCall+" ');
document.write('onMouseOver="window.status=" ' +
        P_OnMouseOverText+" ; return true">');
document.write('<img src="+1_ImagePath+
        'FNDDBEND.gif" border=0 height=28 width=7 border=0
></a></td></tr>');
if (P_ButtonText) {
    document.write('<tr><td height = 1 bgcolor =#FFFFFF>');
    document.write('<img width=1 height=1 src="+
        1_ImagePath+'FNDDBPXW.gif"></td><tr>');
    document.write('<tr><td height=24 align=center
        valign=center' +
        'bgcolor=#cccccc nowrap>');
    document.write('<!--href is button action, and cell
text appears on the button-->');
    document.write('<a href= "+P_HyperTextCall+" ');
    document.write('onMouseOver="window.status="+
        P_OnMouseOverText+" ; return true">');
if (P_DisabledFlag)
    document.write('<font color='
        +1_DisabledColor + '>'+P_ButtonText+
        '</font></a></td></tr>');
else
    document.write('<font color =#000000>'
        +P_ButtonText+
        '</font></a></td></tr>');
document.write('<tr><td height = 1
bgcolor=#999999>');
document.write('<img width=1 height=1 src="+
        1_ImagePath+'FNDDBPX9.gif"></td></tr>');
document.write('<tr><td height=1 bgcolor=#000000>');
document.write('<img width=1 height=1src="+
        1_ImagePath +"FNDDBPXB.gif"></td></tr>');
}
document.write('</table>');
}
. . .
```

TABLE VI

```
DynamicButton('Submit', 'FNDBSBMT.gif', 'Submit',
'dynamicbutton.htm', 'US', false, false);
document.write('</td><td>');
DynamicButton('Cancel', 'FNDBCNCL.gif', 'Cancel',
dynamicbutton.htm', 'US', false, false);
document.write('</td><td>');
</script>
</body>
```

Figure 8:
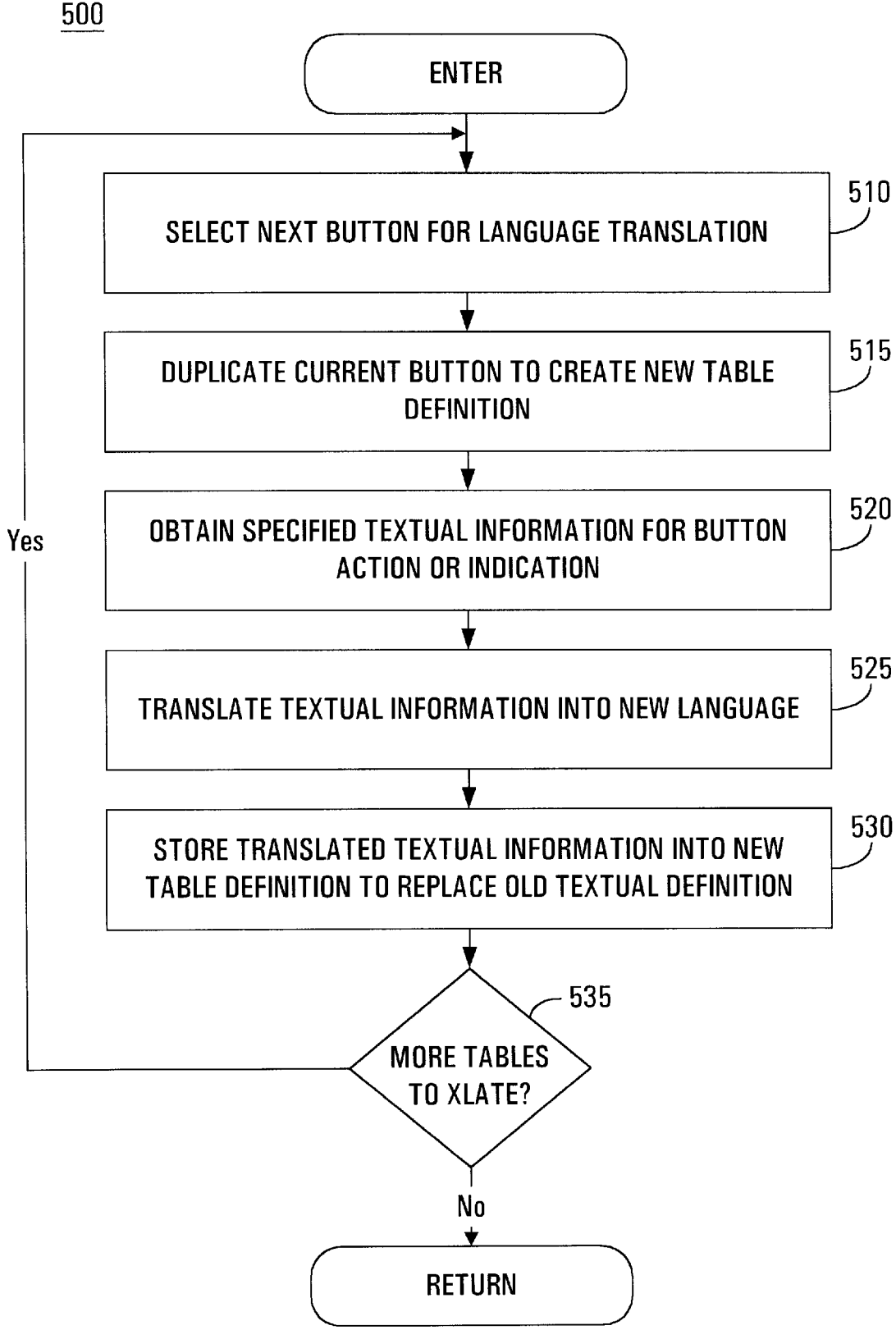
FIG. 8 is a flow diagram illustrating steps performed by the present invention for translating a set of display buttons of the present invention from one language to another.

FIG. 8 illustrates an exemplary language translation process 500 that advantageously uses the display button 200 of the present invention to readily perform language translations (e.g., from English to German, etc.) without the need for complex drawing packages and artists. Process 500 is implemented as instruction code stored in computer readable memory units of a computer system which are executed by a processor. The present invention translates the character based textual link 260 while leaving the graphic images 210 and 220 the same because they are pictorial forms of expression (without any text representations stored therein) and do not require language translation.

At step 510 of FIG. 8, the present invention selects a predefined display button for language translation. It is assumed that this display button already exists in a particular first language (e.g., English) and it is desired to translate the button to a second language (e.g., German) without altering the computer function that is performed by the display button. The definition of the selected display button can be a full definition as shown in Table II or can be defined with respect to a rendering process as in Table VI. In either case, at step 515, the definition of the selected display button is duplicated in memory 102 to create a new display button definition. At step 520, the textual link 260 of the selected display button is obtained.

At step 525, the selected textual link 260 is then translated from the first language (e.g., English) to textual link 260' of the second language (e.g., German). The translation process used for state 525 can any of a number of automatic, computer controlled language translation applications that performs word or phrase translations. It is appreciated that the translation performed at step 525 is automatic. At step 530, the translated textual link 260' is then used to replace the textual link 260 in the new display button definition (e.g., the copy) and stored in computer memory. At step 535, process 500 checks if more tables require translation. If so, step 510 is re-entered to translate another. If not, process 500 eturns.

Using process 500, a group of web pages having display buttons that have integrated graphics and text can be translated by a computer system (e.g., system 130 of FIG. 2) from one language to another without needing to redraw the display buttons. This is the case because the graphic images (e.g., 210 and 220) remain unchanged, yet are integrated with the new translated text such that the overall display button appears as one visual object.

FIG. 9 is an exemplary web page 600 implemented with display buttons in accordance with the present invention and displayed over display 104 of system 112. FIG. 9 illustrates the use of content specific textual information placed within display buttons of the present invention. Specifically, web page 600 represents information regarding a candidate for hire, Bob Katz, within a corporation. The candidate is to be interviewed by a number of employees and status of the interview process is represented by display lines 610, 612, 614, 616 and 618. These display lines indicate the names of the employees performing the interviews as well as status information indicating the result of the interview.

Display buttons 200a–200d are implemented in accordance with the present invention. Button 200a is selected to go to a previously displayed web page and a graphic image of a back arrow "<–" is shown to support the text "Back to List." The entire button 200a is one unified visual object. The same is true for button 200b and 200d.

Button 200c includes certain content specific information. Namely, the person that is to create the offer letter is "Sam White" as shown in line 618. The textual link 260 for button 200c can be automatically replaced depending on the manager that is to create the offer letter and this information is therefore dynamically updated. As such, web page 670 can be automatically customized for and used by a number of different corporate departments having different hiring managers. Web page 600 is advantageous because button 200c automatically becomes customized for a particular application by including a particular name, e.g., "Sam White" that can be changed dynamically instead of using some generic term such as "hiring manager" as might be used in the prior art. Further, the display button includes a graphic image of an envelope to support the action being performed, e.g., emailing information to "Sam White."

FIG. 10 shows another exemplary web page 700 implemented with display buttons in accordance with the present invention. FIG. 10 also illustrates the use of content specific textual information placed within display buttons of the present invention but in this case the content specific information is the result of a computer operation. For example, assume a user just performed a record search through some database of records. The result indicated that 323 records matched the query posed by the user. The present invention inserted the text "323" as textual link 260 of the definition of display button 200e. This customized display button 200e was then integrated into a web page 700 and displayed to the user over display screen 104 of system 112. The present invention provides a single unified visual object that combines an image to support loading (e.g., "<-->") in conjunction with a customized textual description of the record number "323" to aid the user in understanding the action to be taken upon selecting button 200e. It is appreciated that the text "323" is obtained as a result of a real-time computer function (e.g., the search).

FIG. 10 also illustrates other buttons 200f–200l within the present invention. Button 208a within group 208 illustrates a button with depressed edges and upper shadow shading while button 208b illustrates lower shadow shading. Shadow shading makes the button 208a look pressed in and therefore might be used to indicated a setting which is turned on." In all cases of the display buttons displayed in web page 700, the graphic images support the integrated text and both are used to increase the amount of information conveyed to the user about the action to be taken by selecting the respective display button.

The preferred embodiment of the present invention, a display button in HTML code for a web page integrating both graphic images and character based textual information into a single visual object for user interface and selection, is thus described. While the present invention has been described in particular embodiments, it should be appreciated that the present invention should not be construed as limited by such embodiments, but rather construed according to the below claims.

What is claimed is:

1. In a computer system having a processor coupled to bus, a memory coupled to said bus and a display screen, instructions stored in said memory for generating a display button on said display screen when executed by said processor, said instructions comprising:

first cell instructions for creating a first end cap display region and identifying a first graphic image for display in said first end cap display region;

second cell instructions for creating a second end cap display region and identifying a second graphic image for display in said second end cap display region;

third cell instructions for creating a text display region to be rendered between said first and second end cap display regions and having a character based textual link for display therein with a text background color;

fourth cell instructions for creating a first upper row display region of a first background color to be rendered between said first and second end cap display regions and above said text display region; and fifth cell instructions for creating a first lower row display region of a second background color to be rendered between said first and second end cap display regions and below said text display region, wherein said display regions integrate said graphic images and said textual link into one unified visual display button on said display screen and wherein said first and second graphic images are displayed whether or not said display button is selected and wherein further said first, second, third, fourth and fifth cell instructions are of Hypertext Markup Language (HTML) format residing within a Web page definition, and wherein said cell instructions compose said display button with said first and second graphic images, said character based textual link, said first upper row display region and said first lower row display region at a time when said Web page definition is rendered.

2. Computer processed instructions stored in memory as described in claim 1 wherein said textual link is a program call to a function to be performed by said computer system upon a user selecting said text display region.

3. Computer processed instructions stored in memory as described in claim 1 wherein said textual link is an HTML hypertext link for causing said computer system to connect to a predetermined web site upon a user selecting said text display region.

4. Computer processed instructions stored in memory as described in claim 1 further comprising:

sixth cell instructions for creating a second upper row display region of a third background color to be rendered between said first upper row display region and said text display region; and seventh cell instructions for creating a second lower row display region of a fourth background color to be rendered between said first lower row display region and said text display region, said first and second upper row display regions and said first and second lower row display regions creating a boundary adding depth to said display button and wherein said text background color matches one of said first and second graphic images.

5. Computer processed instructions stored in memory as described in claim 1 wherein said first and second graphic images on said display screen with said first upper row display region and said first lower row display region create a graphic outline of said unified visual display button.

6. Computer processed instructions stored in memory as described in claim 5 wherein said first graphic image on said display screen supports, in meaning, said textual link of said text display region.

7. In a computer system having a processor coupled to bus, a memory coupled to said bus and containing hypertext markup language (HTML) cell instructions and a display screen, a method of displaying a display button for a web page, said method comprising the steps of:

from first cell instructions, rendering a first graphic image into a first end cap display region on said display screen;

from second cell instructions, rendering a second graphic image into a second end cap display region on said display screen;

from third cell instructions, rendering a character based textual link having a text background color within a text display region displayed between said first and second end cap display regions, said text background color matching one of said first and second graphic images, and wherein said first graphic image on said display screen supports, in meaning, said textual link of said text display region;

from fourth cell instructions, rendering a first upper row display region having a first background color and displayed between said first and second end cap display regions and above said text display region; and from fifth cell instructions, rendering a first lower row display region having a second background color and displayed between said first and second end cap display regions and below said text display region, and wherein said display regions integrate said graphic images and said textual link into a unified visual display button displayed on said display screen and wherein said first and second graphic images are displayed whether or not said display button is selected and wherein further said first, second, third, fourth and fifth cell instructions are of HTML format residing within a Web page definition, and wherein said cell instructions compose said display button with said first and second graphic images, said character based textual link, said first upper row display region and said first lower row display region at a time when said Web page definition is rendered.

8. A method as described in claim 7 further comprising the step of obtaining said character based textual link from a result of a run-time computer operation.

9. A method as described in claim 7 further comprising the steps of:

translating a first word in character based format of a first language into a second word in character based format of a second language; and storing said second word in character based format into said third cell instructions as said character based textual link.

10. A method as described in claim 7 wherein said character based textual link is a link to a function to be performed by said computer system and further comprising the step of performing said function upon a user selecting said text display region.

11. A method as described in claim 7 wherein said character based textual link is an HTML hypertext link to a predetermined web site and further comprising the step of connecting to said web site upon a user selecting said text display region.

12. A method as described in claim 11 further comprising the steps of:

from sixth cell instructions rendering a second upper row display region of a third background color to be rendered between said first upper row display region and said text display region; and from seventh cell instructions creating a second lower row display region of a fourth background color to be rendered between said first lower row display region and said text display region, said first and second upper row display regions and said first and second lower row display regions creating a boundary adding depth to said display button.

13. A method as described in claim 1 wherein said first and second graphic images on said display screen, said first upper row display region and said first lower row display region create a graphic outline of said unified visual display button.

14. A computer system comprising a processor coupled to a bus, a computer readable memory unit coupled to said bus and a display coupled to said bus, said computer readable memory unit containing instructions that when executed implement method of displaying a display button for a web page, said method comprising the steps of:

from first cell instructions, rendering a first graphic image into a first end cap display region on said display screen;

from second cell instructions, rendering a second graphic image into a second end cap display region on said display screen;

from third cell instructions, rendering a character based textual link having a text background color within a text display region displayed between said first and second end cap display regions, said text background color matching one of said first and second graphic images, and wherein said first graphic image on said display screen supports, in meaning, said textual link of said text display region;

from fourth cell instructions, rendering a first upper row display region having a first background color and displayed between said first and second end cap display regions and above said text display region; and from fifth cell instructions, rendering a first lower row display region having a second background color and displayed between said first and second end cap display regions and below said text display region, and wherein said display regions integrate said graphic images and said textual link into a unified visual display button displayed on said display screen and wherein said first and second graphic images are displayed whether or not said display button is selected and wherein further said first, second, third, fourth and fifth cell instructions are of HTML format residing within a Web page definition, and wherein said cell instructions compose said display button with said first and second graphic images, said character based textual link, said first upper row display region and said first lower row display region at a time when said Web page definition is rendered.

15. A computer system as described in claim 14 wherein said method further comprises the step of obtaining said character based textual link from a result of a run-time computer operation.

16. A computer system as described in claim 14 wherein said method further comprises the steps of:

translating a first word in character based format of a first language into a second word in character based format of a second language; and storing said second word in character based format into said third cell instructions as said character based textual link.

17. A computer system as described in claim 14 wherein said character based textual link is a link to a function to be performed by said computer system and said method further comprises the step of performing said function upon a user selecting said text display region.

18. A computer system as described in claim 14 wherein said character based textual link is a link to a predetermined web site and said method further comprises the step of connecting to said web site upon a user selecting said text display region.

19. A computer system as described in claim 14 wherein said method further comprises the steps of:

from sixth cell instructions rendering a second upper row display region of a third background color to be rendered between said first upper row display region and said text display region; and from seventh cell instructions creating a second lower row display region of a fourth background color to be rendered between said first lower row display region and said text display region, said first and second upper row display regions and said first and second lower row display regions creating a boundary adding depth to said display button.

20. A computer system as described in claim 14 wherein said first and second graphic images on said display, said first upper row display region and said first lower row display region create a graphic outline of said unified visual display button.

* * * * *